(12) United States Patent
Sumi

(10) Patent No.: US 8,035,084 B2
(45) Date of Patent: Oct. 11, 2011

(54) CASSETTE TYPE RADIOGRAPHIC IMAGE SOLID-STATE DETECTOR

(75) Inventor: Makoto Sumi, Tokorozawa (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 12/739,285

(22) PCT Filed: Oct. 2, 2008

(86) PCT No.: PCT/JP2008/067914
§ 371 (c)(1),
(2), (4) Date: Apr. 22, 2010

(87) PCT Pub. No.: WO2009/054242
PCT Pub. Date: Apr. 30, 2009

(65) Prior Publication Data
US 2010/0258730 A1    Oct. 14, 2010

(30) Foreign Application Priority Data

Oct. 26, 2007 (JP) ................................ 2007-278859
Apr. 22, 2008 (JP) ................................ 2008-110814

(51) Int. Cl.
*G01T 1/20* (2006.01)
(52) U.S. Cl. ................................. 250/361 R
(58) Field of Classification Search ............. 250/361 R, 250/370.09, 370.11; 378/182, 189
See application file for complete search history.

(56) References Cited

U.S. PATENT DOCUMENTS

| 5,773,839 | A  | * | 6/1998 | Krepel et al. ............. 250/580 |
| 6,608,312 | B1 |   | 8/2003 | Okada et al. |
| 7,015,478 | B2 |   | 3/2006 | Yamamoto |
| 7,189,972 | B2 |   | 3/2007 | Ertel et al. |
| 2002/0085680 | A1 | * | 7/2002 | Nakajo ............. 378/182 |
| 2004/0114725 | A1 |   | 6/2004 | Yamamoto |

(Continued)

FOREIGN PATENT DOCUMENTS

JP          9-73144 A      3/1997

(Continued)

OTHER PUBLICATIONS

International Search Report for International application No. PCT/JP2008/067914 with English translation mailed Nov. 11, 2008.

*Primary Examiner* — David Porta
*Assistant Examiner* — Marcus Taningco
(74) *Attorney, Agent, or Firm* — Cantor Colburn LLP

(57) ABSTRACT

A cassette type radiographic image solid-sate detector that is an FPD compatible with a CR cassette, thin-shaped with s sufficient strength, capable of preventing a housing from being deformed by external stress to deal with an external shock, and capable of portable radiography. The cassette type radiographic image solid-state detector comprises a detector unit including a scintillator layer for converting incident radiation into light and a signal detecting section for receiving the light obtained by the conversion by the scintillator layer and converting the light to an electrical signal, a housing including a housing body formed of carbon fibers and a first cover member and a second cover member covering openings of the housing body and containing the detector unit. The thickness of the housing in the direction of incidence of the radiation conforms to JIS Z 4905. At least one of the cover members is structured to be insertable into the detector unit.

8 Claims, 15 Drawing Sheets

U.S. PATENT DOCUMENTS

| | | | |
|---|---|---|---|
| 2004/0183039 A1* | 9/2004 | Iiyama | 250/589 |
| 2005/0056789 A1* | 3/2005 | Spahn et al. | 250/370.09 |
| 2006/0038132 A1* | 2/2006 | Hayashida | 250/370.11 |
| 2006/0060804 A1* | 3/2006 | Ohtsuka et al. | 250/589 |
| 2006/0071172 A1* | 4/2006 | Ertel et al. | 250/370.11 |
| 2006/0097177 A1 | 5/2006 | Yamamoto | |
| 2006/0227937 A1* | 10/2006 | Unger | 378/189 |

FOREIGN PATENT DOCUMENTS

| | | |
|---|---|---|
| JP | 2001-74845 A | 3/2001 |
| JP | 2002-311527 A | 10/2002 |
| JP | 2004-173907 A | 6/2004 |
| JP | 2004-219705 A | 8/2004 |
| JP | 2005-114944 A | 4/2005 |
| JP | 2005-121783 A | 5/2005 |

* cited by examiner

|  | MODULUS OF ELASTICITY | THERMAL CONDUCTIVITY |
|---|---|---|
| PAN BASED ACRBON FIBER | 230 Gpa | 0.6 - 3.1 W / mk |
| PITCH BASED CARBON FIBER | 790 Gpa | 220 W / mk |
| ALUMINUM | 73 Gpa | 237 W / mk |

FIG. 8

UNIT: MPa(kgf/cm²)

| GLASS TYPE | NOMINAL THICKNESS | SHORT-TERM PEMISSIBLE STRESS | | LONG-TERM PERMISSIBLE STRESS | |
|---|---|---|---|---|---|
| | | ON THE INNER SURFACE (σ ae) | EDGE (σ ae) | ON THE INNER SURFACE (σ ae) | EDGE (σ ae) |
| FLOAT GLASS PLATE. HEAT ABSORBING GLASS PLATE. HEAT REFLECTING GLASS PLATE. | 8 mm OR LESS | 24.5 (250) | 17.7 (180) | 9.8 (100) | 6.9 (70) |
| | EXCEEDING 8 mm AND AT OR BELOW 12 mm | 22.1 (225) | 17.7 (180) | 8.8 (90) | 6.9 (70) |
| | EXCEEDING 12 mm AND AT OR BELOW 20 mm | 19.6 (200) | 17.7 (180) | 7.8 (80) | 6.9 (70) |
| | EXCEEDING 20 mm | 18.6 (190) | 17.7 (180) | 7.4 (75) | 6.9 (70) |
| WIRED/ PLOLISHED AND WIRED GLASS | | 19.6 (200) | 9.8 (100) | 7.8 (80) | 3.9 (40) |
| WIRED/ FIGURED AND WIRED GLASS | | 14.7 (150) | 9.8 (100) | 5.9 (60) | 39 (40) |
| STRENGTHENED GLASS | | 88.3 (900) | 79.4 (810) | 73.5 (750) | 68.6 (700) |
| HEAT STRENGTHENED GLASS | | 44.1 (450) | 35.3 (360) | 29.4 (300) | 24.5 (250) |

FIG. 9

|  | CASE OF FOUR-SIDE SUPPORTED | REMARK |
|---|---|---|
| GLASS SIZE mm a | 364.6 |  |
| GLASS SIZE mm b | 440.6 |  |
| b/a | 1.2 |  |
| $\beta 1$ | 0.362 |  |
| $\alpha 1$ | 0.064 |  |
| GLASS THICKNESS mm t | 1.2 | SET UP AT 0.6 mm X 2 = 1.2 |
| (LOAD APPLIED TO THE GLASS kg) | (11.1) |  |
| LOAD APPLIED TO THE GLASS N | 108.78 | 1kg=9.8N |
| LOAD APPLIED TO THE GLASS W N/m$^2$ | 677 |  |
| LOAD APPLIED TO THE GLASS W MPa | 0.00067715 |  |
| YOUNG MODULUS OF THE GLASS PLATE E MPa | 71600 |  |
| MAXIMUM STRESS σ MPa | 23 |  |
| MAXIMUM DEFLECTION AMOUNT δmm | 6 |  |
| PERMISSIBLE STRESS MPa | 24.5 |  |

COEFFICIENT: $\beta_1$, $\alpha_1$

| b/a | 1.0 | 1.1 | 1.2 | 1.3 | 1.4 | 1.5 | 1.6 | 1.7 | 1.8 | 1.9 | 2.0 |
|---|---|---|---|---|---|---|---|---|---|---|---|
| $\beta_1$ | 0.272 | 0.318 | 0.362 | 0.403 | 0.441 | 0.475 | 0.507 | 0.535 | 0.580 | 0.583 | 0.603 |
| $\alpha_1$ | 0.046 | 0.055 | 0.064 | 0.703 | 0.081 | 0.088 | 0.094 | 0.100 | 0.106 | 0.111 | 0.115 | ced as compared to the CR cassette as the entire detector by the use of a rigid housing for protecting the internal detection panel.

CASSETTE TYPE RADIOGRAPHIC IMAGE SOLID-STATE DETECTOR

CROSS REFERENCE TO RELATED APPLICATIONS

This is a U.S. national stage application of International Application No. PCT/JP2008/067914, filed on 2 Oct. 2008. Priority under 35 U.S.C. §119(a) and 35 U.S.C. §365(b) is claimed from Japanese Application No. JP2007-278859, filed 26 Oct. 2007 and Japanese Application No. JP2008-110814, filed 22 Apr. 2008, the disclosures of which are also incorporated herein by reference.

FIELD OF THE INVENTION

The present invention relates to a cassette type radiographic image solid-state detector.

BACKGROUND OF ART

A radiographic image represented by an X-ray image and captured by radiation has found widespread application for the purpose of disease diagnosis and others.

The radiographic image for medical treatment was captured using a screen film in the conventional method. However, the successful digitization of a radiographic image in recent years has allowed a CR (Computed Radiography) apparatus to come into widespread use, for example, wherein the radiation having passed through a subject is accumulated on a stimulable phosphor sheet wherein a stimulable phosphor layer is formed. The stimulable phosphor sheet is then scanned by a beam of laser, so that the stimulable light emitted from the stimulable phosphor sheet is subjected to photoelectric conversion, whereby image data is obtained (for example, Patent Literatures 1 and 2).

A cassette (for example, Patent Literatures 1 and 2) incorporating a recording medium such as a screen film or a stimulable phosphor sheet is used to capture a radiographic image. It should be noted that the CR cassette used for radiographing with a CR apparatus is designed and manufactured according to the JIS-based dimensions of the screen/film cassette in order to ensure continued use of the existing device such as the cassette holder or Bucky's table having been introduced to conform to the conventional cassette for screen/film use. To put it another way, the compatibility of the cassette dimensions is maintained, and the effective use of the devices and digitization of the image data have been achieved.

In recent years, as a device for acquiring a radiographic image for medical use, a FPD (Flat Panel Detector) has come to be known as a detector capable of detecting the radiation having been applied, and acquiring the digital image data (for example, Patent Literature 3).

Further, a portable radiographic apparatus (portable FPD) wherein this FPD is incorporated in a housing has come to be put into commercial use (for example, Patent Literatures 4 and 5). Such a portable detector is characterized by easy transportation, and can be brought to the medical ward of a patient for radiographing. Further, the position and angle can be freely adjusted in conformity to the position and angle of the position to be radiographed, and this apparatus is expected to be utilized over a wide range.

As described in the Patent Literatures 4 and 5, in the portable detector, a grip is provided on one end of the enclosure for incorporating the FPD for easy transportation. This is intended to improve the maneuverability of the detector by a radiographer and others because the weight of this detector is increased as compared to the CR cassette as the entire detector by the use of a rigid housing for protecting the internal detection panel.

Patent Literature 1: Japanese Unexamined Patent Application Publication No. 2005-121783
Patent Literature 2: Japanese Unexamined Patent Application Publication No. 2005-114944
Patent Literature 3: Japanese Unexamined Patent Application Publication No. Hei 9-73144
Patent Literature 4: Japanese Unexamined Patent Application Publication No. 2002-311527
Patent Literature 5: U.S. Pat. No. 7,189,972

DISCLOSURE OF THE INVENTION

Problems to be Solved by the Invention

As described above, the CR cassette currently in widespread use has the dimensions conforming to the JIS in the conventional screen/film cassette. The Bucky's table and others are manufactured in conformity to the JIS. Thus, if the FPD can be used in the form incorporated in the cassette conforming to the JIS dimensions, the existing devices installed in the facilities can be used for radiographing operations using the FPD. This reduces the equipment investment when an FPD is to be introduced as a radiographing means.

However, as will be clear from the installation of a grip, the detector described in the Patent Literatures 4 and 5 does not conform to the aforementioned JIS dimensions, and fails to allow use of the existing devices.

When the detector is subjected to the impact caused by falling, the housing will be deformed and the load will be applied to the internal glass substrate and electrical component. This may damage the component and deteriorate the image quality.

If the enclosure is provided with a grip, this grip is used to carry the detector. In the event that the detector is fallen inadvertently, the detector will fall from the end opposite to the grip. Thus, in the case of a simple portable detector as described in the Patent Literatures 4 and 5, it is only required to design a structure capable of withstanding the impact applied from the direction where such falling is estimated to occur.

By contrast, the cassette conforming to the aforementioned JIS dimensions is a thin flat plate free from a grip. When the cassette is to be carried to somewhere, it is not specified what part of the cassette should be held. When it is fallen, it is impossible to predict from what part and how the detector will fall. In the case of such a cassette, there is a substantial improvement in the degree of freedom of the cassette installation position (direction of installation) when a patient is radiographed. Thus, it is impossible to predict from which direction the weight (load) of the patient is applied to the cassette when correcting the cassette position with reference to the patient. This involves the problem that the strength of the entire cassette must be improved.

Further, when the strength is to be improved, a rigidity and lightweight structure must be designed without the weight being increased wherever possible.

Thus, the object of the present invention is to solve the aforementioned problems and to provide a cassette type radiographic image solid-state detector that is an FPD capable of implementing the digitization of image data, wherein the aforementioned cassette type radiographic image solid-state detector is designed in a thin-shaped structure characterized by a compatibility with a CR cassette and sufficient strength, and is capable of preventing a housing from being deformed by external stress and withstanding an external shock, whereby portable radiographing can be performed.

Means for Solving the Problems

To achieve the aforementioned object, the present invention is a cassette type radiographic image solid-state detector including:

a detector unit further including a scintillator for converting incoming radiation into light, and a detecting section for receiving the light obtained by conversion by the scintillator and converting the light to an electrical signal; and a housing containing the detector unit, the housing further including a rectangular tubular housing body formed of carbon fibers and having openings on both ends, and a first cover member and second cover member engaged with the housing body by means of an engagement device, wherein these cover members cover the openings of the housing body;

wherein the thickness of the housing in the direction of incidence of the radiation conforms to JIS Z 4905, and at least one of the first and second cover members is constructed to allow for inserting the detector unit into the housing body.

The present invention is a cassette type radiographic image solid-state detector including:

a detector unit further including a scintillator for converting incoming radiation into light, and a detecting section for receiving the light obtained by conversion by the scintillator and converting the light to an electrical signal; and a housing containing the detector unit, the housing further including a rectangular tubular housing body formed of carbon fibers and having openings on both ends, and a first cover member and second cover member engaged with the housing body by means of an engagement device, wherein these cover members cover the openings of the housing body;

wherein the thickness of the housing in the direction of incidence of the radiation does not exceed 16 mm, and at least one of the first and second cover members is constructed to allow for inserting the detector unit into the housing body.

Advantages of the Invention

In the cassette type radiographic image solid-state detector (cassette FPD) of the present invention, the thickness of the housing in the direction of incidence of the radiation conforms to the JIS dimensions for cassette without exceeding 16 mm. This arrangement allows the existing apparatuses and devices to be utilized, similarly to the case of the CR cassette, and minimizes the equipment investment for introduction of the FPD as an imaging device.

The housing incorporating the detector unit includes:

a rectangular tubular housing body formed of carbon fibers and having openings on both ends, and a first cover member and second cover member for covering the openings of the housing body formed on both ends of the housing body. This arrangement prevents the housing from being deformed by external stress that may be applied from any direction, and protects the component in the housing against possible damage.

The number of the junctures (joints) between components is smaller than that in the conventional structure. This arrangement ensures that the water content or foreign substances such as powder dust, sweat of the patient and antiseptic solution cannot easily enter the housing, whereby the service life of the internal electrical component can be prolonged.

When a rigid housing is formed, the strength thereof does not depend on the rigidity of the metallic component per se (plate thickness), as in the conventional art. Thus, even when the housing is designed to have the dimensions permitting compatibility with the CR cassette, this arrangement ensures compatibility between reduced weight and increased rigidity wherein deformation is minimized in the event of the entire patient load being applied thereto.

BRIEF DESCRIPTION OF THE DRAWINGS

FIG. 8 is an explanatory diagram showing the permissible stress of the glass substrate;

FIG. 9 is an explanatory diagram showing the maximum stress and maximum deflection in the four-side supported glass substrate;

FIG. 25b is a cross sectional view taken along arrow line E-E of FIG. 25a.

DESCRIPTION OF NUMERALS

Figure 1:
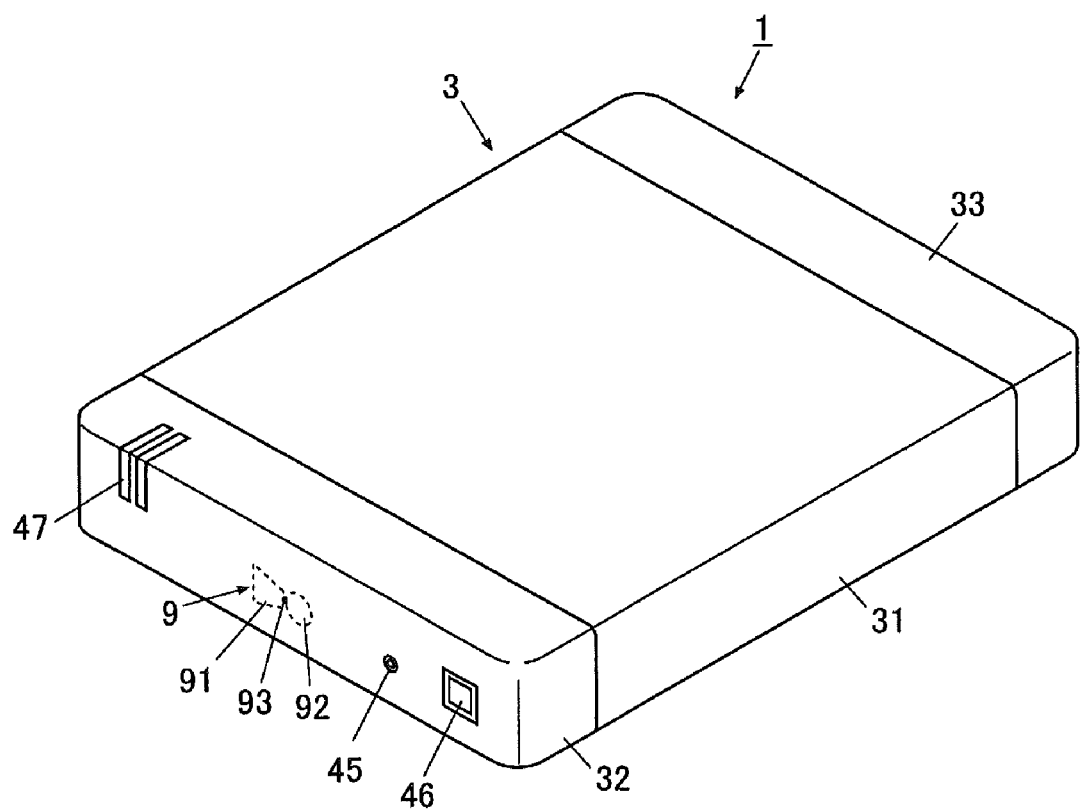
FIG. 1 is a perspective view representing a cassette type radiographic image solid-state detector in the present embodiment.

1. Cassette type detector (cassette type radiographic image solid-state detector,
2. Detector unit
3. Housing
9. Antenna device (interface component)
21. Detection panel
22. Electronic component
23. Circuit board
24. Base
25. Rechargeable battery (power supply section)
31. Housing body (body)
32. First cover member
33. Second cover member
45. Recharging terminal (interface component)
46. Power switch (interface component)
47. Indicator (interface component)
151. Signal detection section (detection section)
211. Scintillator layer (scintillator)
213. Second glass substrate
214. First glass substrate
217. Sealing member (bonding member)
323. Buffer member
333. Buffer member
324. Engagement piece (engagement device)
334. Engagement piece (engagement device)

BEST MODE FOR CARRYING OUT THE INVENTION

Referring to FIGS. 1 through 20, the following describes an embodiment of a cassette type radiographic image solid-state detector of the present invention, without the present invention being restricted thereto.

FIG. 1 is a perspective view representing a cassette type radiographic image solid-state detector (hereafter called "cassette type detector") in the present embodiment.

The cassette type detector 1 of the present invention is a cassette flat panel detector (hereafter called "FPD"). The cassette type detector 1 includes a detector unit 2 (FIG. 12 and others) for detecting the radiation applied and acquiring it as a digital image data, and a housing 3 for incorporating this detector unit 2 into the housing 3.

In this embodiment, the housing 3 is formed in such a way that the thickness in the direction of incidence of the radiation will be 15 mm. Although the thickness of the housing 3 in the direction of incidence of the radiation is not restricted to 15 mm, it is preferred that this thickness do not exceed 16 mm, and be maintained within the range of the dimension (15 mm+1 mm and 15 mm−2 mm) conforming to the JIS (JIS Z 4905) in the conventional screen/film cassette. It should be noted that the international standard corresponding to the JIS (JIS Z 4905) is IEC 60406.

Almost all the existing devices such as a CR cassette and Bucky's table are manufactured in conformity to the JIS for the screen/film cassette. Thus, if the dimension of the housing 3 conforms to the JIS dimension, the existing device can be utilized even when radiographing is performed using the cassette type detector 1 as the cassette FPD.

Figures 2, 3:
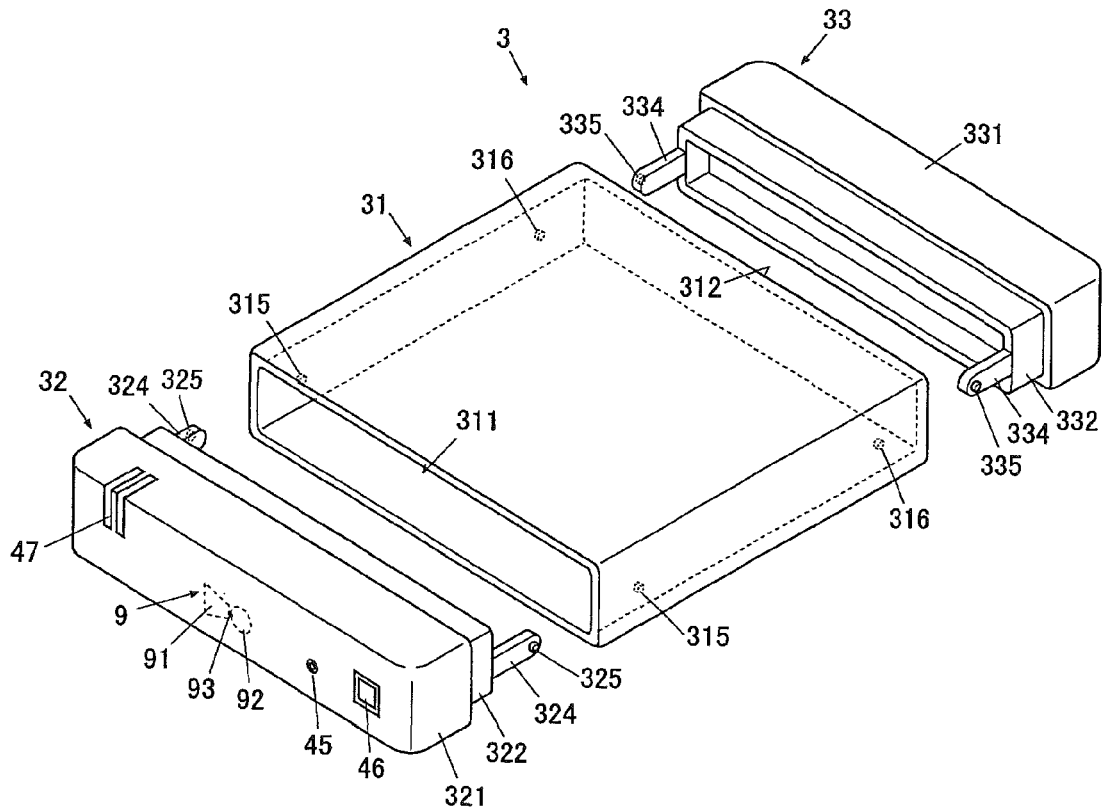
FIG. 2 is a perspective exploded view representing a housing in the present embodiment.
FIG. 3 is a chart showing the comparison of the modulus of elasticity and thermal conductivity among various types of material.

FIG. 2 is a perspective exploded view representing the housing 3 in the present embodiment.

As shown in FIG. 2, the housing 3 includes a hollow rectangular tubular housing body 31 having openings 311, 312 on both ends, and a first cover member 32 and second cover member 33 for covering and closing each of the openings 311, 312 of the housing body 31.

The first cover member 32 and second cover member 33 are provided with cover bodies 321, 331 and insertion sections 322 and 332, and are formed of the non-conductive material such as a non-conductive plastic.

The cover bodies 321, 331 are formed in such a way that the outer periphery has the dimensions approximately the same as those of the outer periphery of the openings 311, 312 of the housing body 31. The dimension of the cover bodies 321, 331 in the direction of insertion into the openings 311, 312 is 8 mm. There is no restriction on the aforementioned dimensions of the cover bodies 321, 331. For the cover body 321 provided with the antenna device 9, the aforementioned dimension is preferably equal to or greater than 6 mm, and more preferably equal to or greater than 8 mm.

The insertion sections 322 and 332 are formed in a frame structure wherein openings are provided on the insertion side toward the openings 311, 312. The outer periphery of the insertion sections 322 and 332 has the dimension slightly smaller than that of the inner periphery of each of the openings 311, 312 of the housing body 31.

The buffer members 323, 333 (FIG. 12 and others) capable of alleviating the external force transmitted from the outside to the detector unit 2 are provided inside the insertion sections 322 and 332. There is no restriction to the form of the buffer members 323, 333 as long as they can alleviate the external force. For example, expandable urethane or silicone can be utilized.

Figure 14:
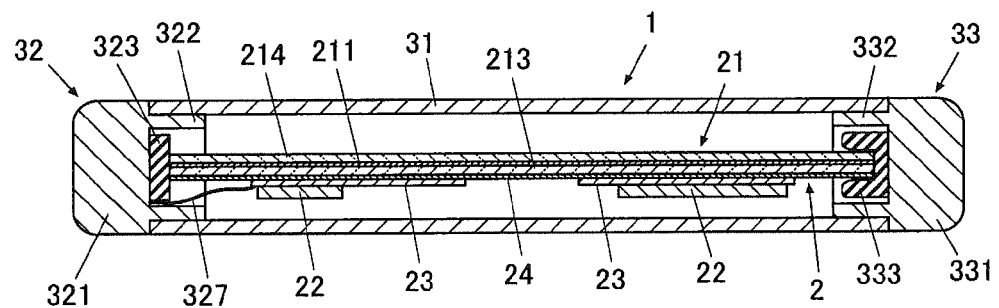
FIG. 14 is a cross sectional view taken along arrow line B-B of FIG. 12.

The buffer member 333 provided inside the insertion section 332 is designed to have a V-shaped structure (FIGS. 14 and 20). It can be formed of any one of elastic, viscous and viscoelastic bodies. The buffer member 333 is preferably formed in such a way as to be deformed when the detector unit 2 closely abuts on the buffer member 333. The buffer members 323, 333 also function as the holding members for holding the detector unit 2 at a proper position inside the housing 3.

The engagement pieces 324 and 325 as engagement devices for engaging the housing body 31 with the cover members 32, 33 extend in the direction of insertion into the openings 311, 312 from each side of the insertion sections 322 and 332. Engagement protruding sections 325, 335 each are provided on the outer surfaces of the engagement pieces 324 and 325.

Water proof rings (not illustrated) formed of rubber and others are preferably provided on the outer peripheral portions of the insertion sections 322 and 332. If the water proof rings are provided, there will be an increase in the adhesion between the housing body 31 and cover members 32 and 33. This arrangement avoids intrusion of the water content or foreign substances such as powder dust, sweat of the patient and antiseptic solution.

An antenna device 9 for radio exchange of information between the cassette type detector 1 and external device is embedded in one side of the cover body 321 of the first cover member 32 on the surface perpendicular to the side of the cassette type detector 1 wherein radiation enters.

The antenna device 9 is provided with a pair of flat radiation plates 91 and 92 made of metal, and a power supply section 93 for supplying power to the pair of flat radiation plates 91 and 92 connected together.

In the present embodiment, the radiation plate 91 of a pair of radiation plates 91 and 92 is formed to have an almost trapezoidal front view. The radiation plate 92 is formed to have an almost circular front view. The power supply section 93 is connected approximately to the center of the upper bottom portion of the radiation plate 91, and is also connected to part of the radiation plate 92.

Connection with the power supply section 93 ensures a predetermined clearance to be formed between a pair of radiation plates 91 and 92.

Figure 12:
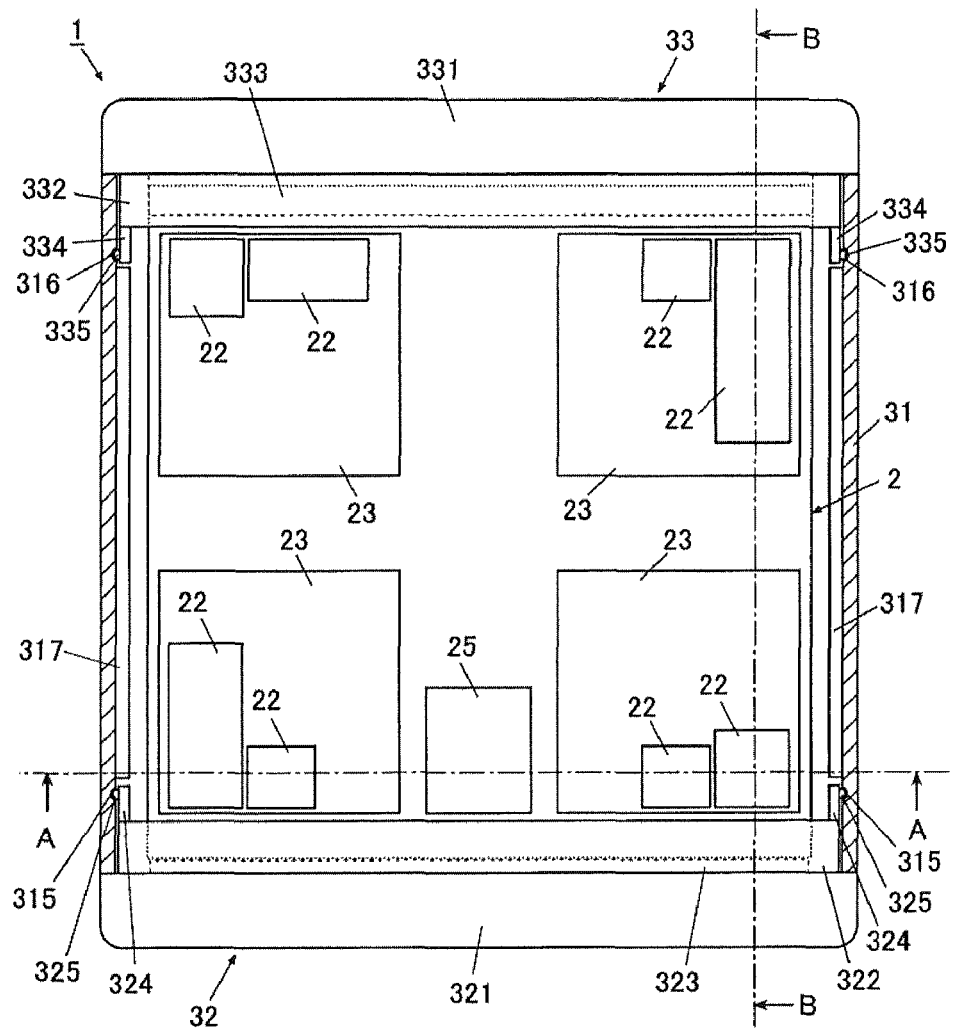
FIG. 12 is a schematic view showing the internal structure of the cassette type detector of FIG. 1.

The type and configuration of the antenna device 9 are not restricted to the ones illustrated here. The antenna device 9 is not restricted to the case wherein the antenna device 9 is embedded in the cover body 321. The antenna device 9 can be bonded on the outer surface or inner surface of the cover body 321. However, if the antenna device 9 is installed in a close proximity to the conductive member made of conductive material such as metal or carbon, the receiving sensitivity and gain will be deteriorated. To avoid this, the antenna device 9 is preferably installed at the furthest possible position from the housing body 31 made of the conductive material such as carbon, and various types of electronic components 22 made of metal (FIG. 12 and others). The distance of separation is preferably equal to or greater than 6 mm, more preferably equal to or greater than 8 mm.

In the present embodiment, as described above, the antenna device 9 is located on the cover body 321 made of a non-conductive material, and the dimension in the direction of insertion into the opening 311 of the cover body 321 is 8 mm. Thus, the antenna device 9 is arranged at a position 8 mm apart from the housing body 31 made of the material including the conductive material such as a carbon fiber. This is preferred from the viewpoint of receiving sensitivity and gain.

As shown in FIGS. 1 and 2, a recharging terminal 45 and a power switch 46 are mounted on the surface of the cover body 321 wherein the antenna device 9 is formed. This recharging terminal 45 is used for connection with an external power source when charging the rechargeable battery 25 (FIG. 12 and others) arranged inside the housing 3. And the power switch 46 is arranged for power ON/OFF operation of the cassette type detector 1. An indicator 47 is arranged at the angular portion formed between the surface with antenna device 9 formed thereon and the surface wherein radiation enters, wherein this indicator 47 formed of a LED, for example, indicates the charging status of the rechargeable battery 25 and various operation statuses.

In the present embodiment, the interface component includes the aforementioned recharging terminal 45, power switch 46, indicator 47 and antenna device 9, and is defined as the electronic/electric components arranged on the cassette type detector 1 and provided outside the detector unit 2.

The present embodiment illustrates the case wherein all the aforementioned interface components are mounted on the first cover member 32. However, all or some of these components can be mounted on the second cover member 33 and others. Further, the interface components are not restricted to the ones illustrated here. Other components may be included, or some of them may not be included.

The housing body 31 is formed according to the following procedure: A carbon fiber is wound around the core material (mold) to get a desired thickness (e.g., 1 through 2 mm). After that, the shape is adjusted, and thermoplastic resin is supplied on the carbon fiber wound around the core. This is then baked at a high temperature and high pressure, to be molded. After that, the core material is removed to get the housing body 31.

The rectangular plate-formed member conforming to the housing body 31 of a predetermined dimension is formed in advance at a desired thickness (e.g., 1 through 2 mm), and this plate-formed member is bent along the core material (mold) so that the end faces are bonded by an adhesive or the like, whereby a rectangular sleeve form can be obtained.

When the aforementioned methods are used to form the housing body 31, the dimensions on the inner periphery of the housing body 31 are accurately determined by the dimensions on the outer periphery of the core material (mold). This arrangement easily provides a housing body 31 free from dimensional variation.

Further, the housing body 31 can be formed as an integral structure free from a juncture. Thus, when external impact is applied, the external force and pressure can be dispersed.

A pitch based carbon fiber is preferably used as the carbon fiber constituting the housing body 31.

FIG. 3 is a chart showing the comparison of the modulus of elasticity and thermal conductivity among various types of material. The carbon fiber is available in two types; a PAN-based carbon fiber and pitch-based carbon fiber. As shown in FIG. 3, the pitch-based carbon fiber has a modulus of elasticity more than three times that of the PAN-based carbon fiber. A sufficient strength can be obtained with the pitch-based carbon fiber even when the thickness of the housing body 31 is reduced. Further, the carbon fiber generally has a lower thermal conductivity than the metal such as aluminum. If heat is generated in the housing formed of a carbon fiber, heat will be confined inside without being released.

The pitch-based carbon fiber has almost the same thermal conductivity as aluminum. Even if a plurality of heat generating components such as the electronic component 22 (to be described later) and rechargeable battery 25 are arranged inside the housing 3, the generated heat can be effectively employed. This eliminates the possibility of heat being confined inside to give an adverse effect.

Inside the housing body 31, the engagement recessed sections 315, 316 engaged with the engagement protruding sections 325, 335 are provided at the positions corresponding to the engagement protruding sections 325, 335 of the engagement pieces 324 and 325 of the cover members 32 and 33, as shown in FIGS. 2 and 12.

In the housing 3, the insertion section 322 of the first cover member 32 is inserted into the opening 311 of one lateral end of the housing body 31, and the insertion section 332 of the second cover member 33 is inserted into the opening 312 of the other end. The engagement protruding sections 325, 335 are engaged with the engagement recessed sections 315, 316, whereby the openings 311, 312 are closed and the internal portion is enclosed. Thus, an integrated structure is formed. The device for connecting the housing body 31 with the cover members 32 and 33 are not restricted to the ones illustrated here. For example, screws can be used for connection. Alternatively, the housing body 31 and cover members 32 and 33 can be bonded and fixed.

In the present embodiment, after assembling, the first cover member 32 and second cover member 33 are fixed onto the housing body 31, and cannot be removed therefrom. This structure increases hermeticity inside the housing 3. Thus, for example, when the rechargeable battery 25 has to be replaced, the cover members 32 and 33 are broken to disassemble the cassette type detector 1. The cover members 32 and 33 are less costly and the loss can be minimized if they are broken. In the meantime, the detector unit 2 located inside can be taken out for reuse.

Both ends inside the housing body 31 are provided with the buffer members 317 for protecting the detector unit 2 against possible damage through interference with the inner wall surface of the housing body 31. There is no particular restriction to the material of the buffer member 317. For example, an elastic resin such as silicone and polyurethane can be used as appropriate.

To ensure that the external load (weight of the patient, etc.) will not be applied to the detector unit 2 incorporated in the housing 3, it is necessary to provide a regulation in such a way that the deflection of the cassette type detector 1 as a whole is kept within the permissible deflection of the detector unit 2.

The following description will be given showing the data on the maximum deflection of the housing 3 of the cassette type detector 1 assumed at the time of radiographing a patient, and the stress working on the glass substrates 213, 214 constituting the detector unit 2.

Figure 4:
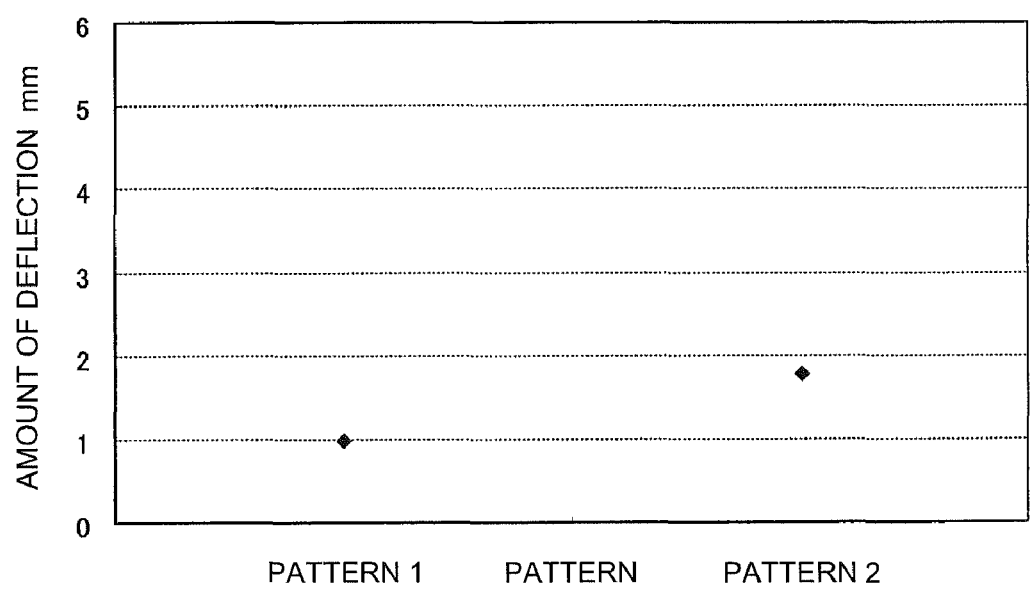
FIG. 4 is a chart representing the result of simulation regarding the amount of deflection of the housing.

FIG. 4 is a chart representing the result of simulation regarding the amount of deflection of the housing 3.

In this simulation, the pitch-based carbon fiber having a modulus of elasticity in tension of 790 GPa is used as the carbon fiber in the housing body 31. A hollow cubic (wall thickness: 2 mm) housing (cassette type detector 1) is used, wherein the height of the side surface of the housing 3 is 16 mm (hence, the thickness of the cassette is 16 mm), and the reference plate thickness (reference wall thickness) of the housing body 31 is 2 mm. The dimension used is 14"×17", the size most subjected to deflection.

Figure 6:
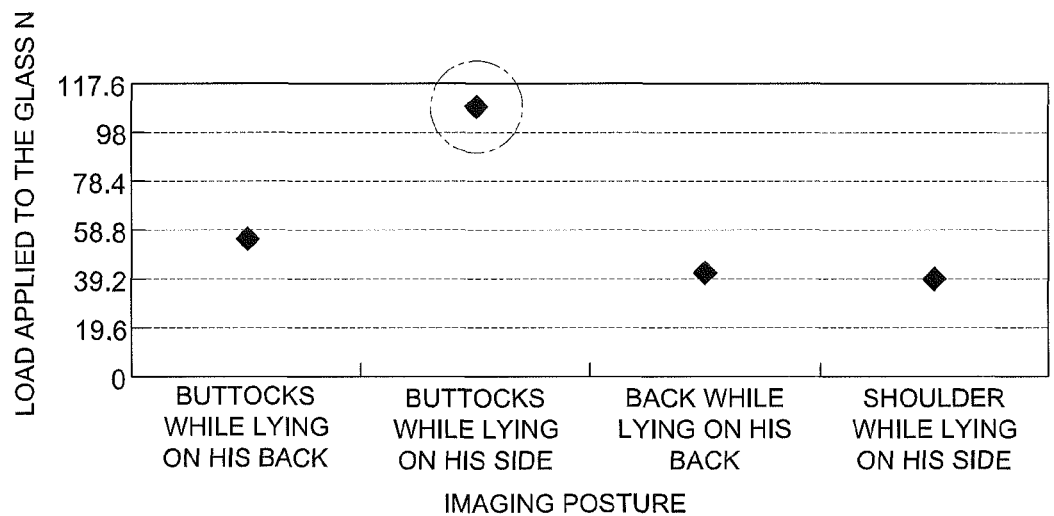
FIG. 6 is a chart showing the load applied to the glass substrate for each imaging posture.

The load applied to the cassette type detector 1 differs according to the posture of radiographing. The posture of radiographing subjected to the greatest load in the conceivable environment is achieved when the patient lies on his side and the cassette type detector 1 is placed under the buttocks (FIG. 6). The simulation of FIG. 4 is based on the assumption that the cassette type detector 1 placed under the patient is shifted in this posture.

Figure 5A:
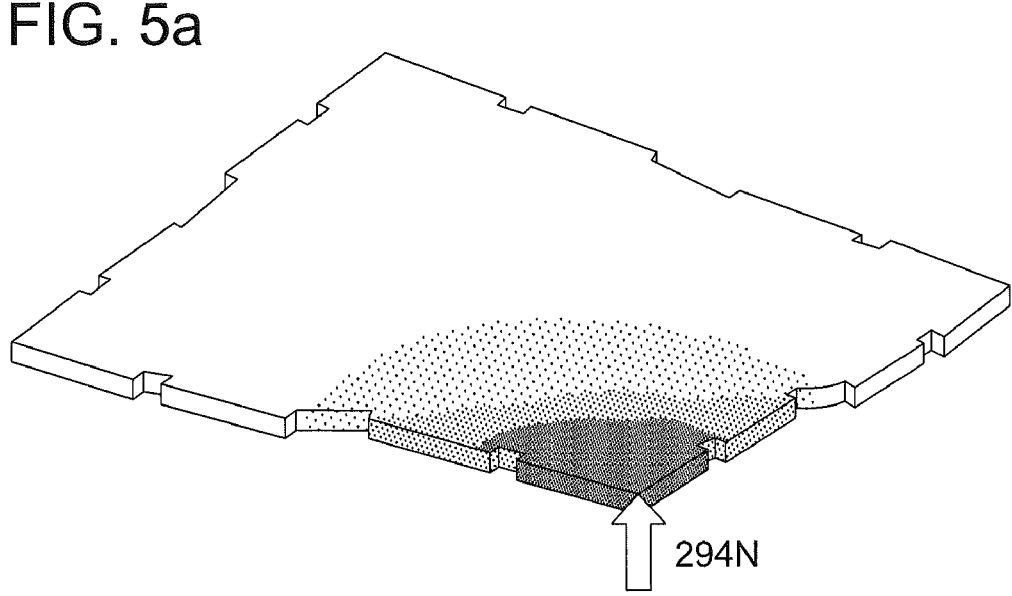
FIGS. 5a and 5b are explanatory diagrams showing how the load is applied when held by a cantilever beam.
Figure 5B:
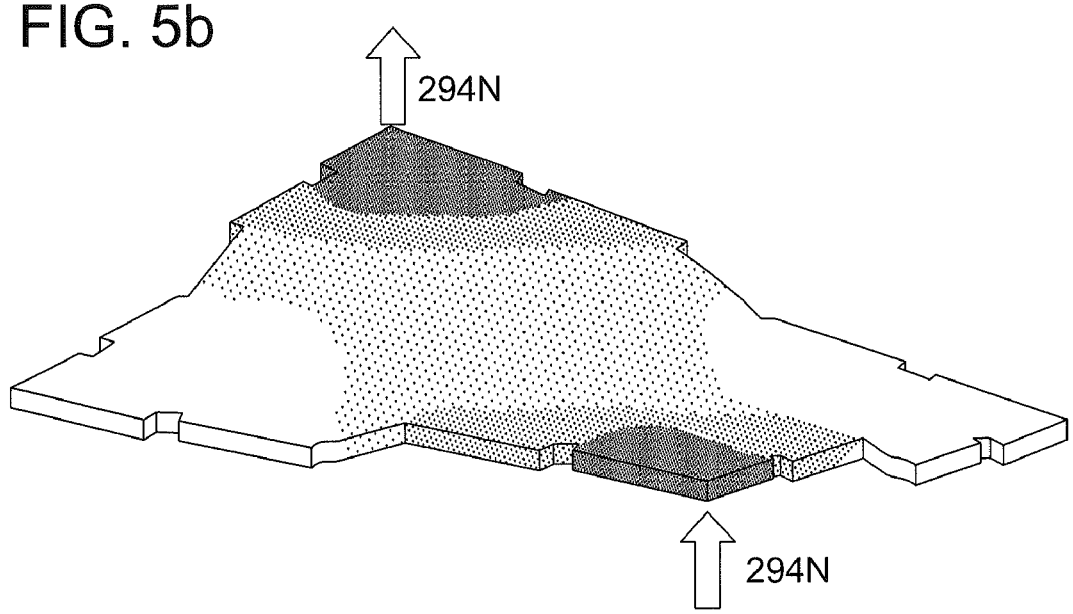

In the pattern 1 of FIG. 4, only one end of the cassette type detector 1 is held as in the case of using a cantilever beam, as shown in FIG. 5a. The pattern 1 shows the maximum deflection of the cassette type detector 1 at the time of shifting the cassette type detector 1 wherein a load is applied from the top. This is based on the assumption, for example, that the cassette type detector 1 is once set under the buttocks of the patient lying on his side in the bed, and the detector is shifted by one person to change this position. In the pattern 2 of FIG. 4, two ends located diagonally are held, as shown in FIG. 5b. The pattern 2 shows the maximum deflection of the cassette type detector 1 in moving the cassette type detector 1 with a load applied thereto, similarly to the case of pattern 1. This is based on the assumption, for example, that the detector is shifted by two persons.

The result of measurement shows that about 294 N (30 kg) is the maximum load applied to the housing 3 of the cassette type detector 1 in moving the cassette type detector 1 placed under the patient lying on the bed. Thus, in both the patterns 1 and 2, measurement was taken of the deflection when the load of 294 N (30 kg) is applied to the ends holding the cassette type detector 1.

As a result, it has been revealed in both cases that, as shown in FIG. 4, the maximum deflection of the housing 3 of the cassette type detector 1 can be kept at a level less than 2 mm.

FIG. 6 shows the result of using the pressure measuring apparatus 7 (FIG. 7) to measure the force (stress) working on the glass substrates 213, 214 of the detector unit 2 at the time of radiographing using the cassette type detector 1 placed on a relatively rigid structure such as a Bucky's table.

Figure 7:
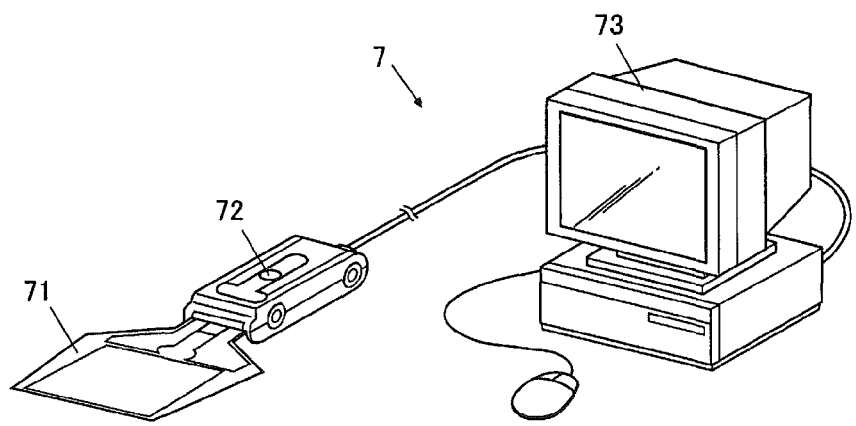
FIG. 7 is a diagram showing the schematic structure of a pressure measuring apparatus.

As shown in FIG. 7, the pressure measuring apparatus 7 is provided, for example, with a sensor sheet 71 that outputs the change in the pressure applied from the outside after converting this change into an electrical signal using a pressure sensitive element, and a computer 73 for receiving the electrical signal outputted from the sensor sheet 71, through the sensor connector 72. To put it more specifically, measurement was made using the I-SCAN system of Nitta Co., Ltd.

Measurement was performed for the combinations of the following four radiographing postures and radiographing sites; the posture wherein the cassette type detector 1 was placed under the buttocks of a patient while he was lying on his back; the posture wherein the cassette type detector 1 was placed under his back; the posture wherein the cassette type detector 1 was placed under the buttocks of the patient while the patient was lying on his side; and the posture wherein the cassette type detector 1 was placed under his shoulder while the patient was lying on his side. The sensor sheet 71 of the pressure measuring apparatus 7 was placed under the radiographing site of the patient for each case, and the pressures applied to the housing 3 of the cassette type detector 1 were measured.

As described above, the load applied to the cassette type detector 1 is maximized at the radiographing posture when the patient was lying on his side on the bed, and the cassette type detector 1 was placed under the buttocks. For example, when a patient having a weight of 100 kg is to be radiographed under this radiographing posture, the maximum load working on the glass substrates 213, 214 of the detector unit 2 of the cassette type detector 1 is about 108 N (11 kg), as shown in FIG. 6.

The deflection of the housing 3 occurring at the time of shifting the cassette type detector 1 by holding the same, for example, as in the case of using a cantilever beam does not exceed 2 mm. In the meantime, the permissible deflection of the detector unit 2 is 6 mm. Thus, even if the cassette type detector 1 once set under the patient is shifted or the position of this cassette type detector 1 is changed at the time of radiographing with the overall weight of the patient applied to the housing 3, the maximum stress applied to the glass substrates 213, 214 does not exceed the permissible stress of the glass substrates 213, 214. Thus, this arrangement ensures that the glass substrates 213, 214 are not broken or damaged.

For the glass plate (glass substrate) having a thickness of 8 mm or less, the permissible stress (short-term permissible stress) applied momentarily that works when the cassette type detector 1 is shifted is 24.5 MPa on the inner surface of the glass substrate, as shown in FIG. 8.

If uniformly distributed load is applied when the four sides of such a rectangular plate-formed member as the glass substrates 213, 214 are supported, the maximum stress is 23 MPa and the maximum deflection is 6 mm as shown in FIG. 9.

Figures 10, 11:
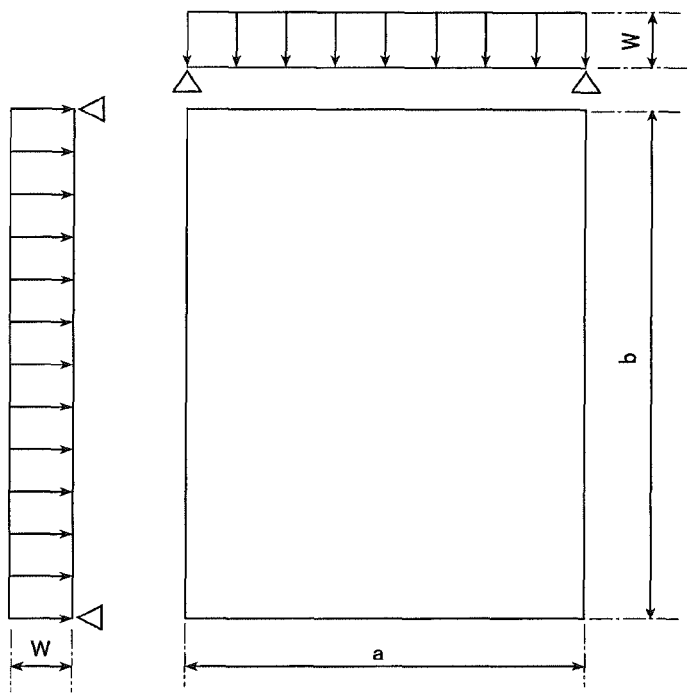
FIG. 10 is an explanatory diagram showing the four-side supported glass substrate.
FIG. 11 is an explanatory diagram showing the coefficient in the four-side supported glass substrate.

The maximum stress in FIG. 9 is calculated using the Formula (1) after determining the coefficients $\alpha_1$ and $\beta_1$ (FIG. 11) when the ratio of long side to short side "b/a" is 1.2, wherein "b" denotes the longitudinal direction of the rectangular plate-formed member supported on four sides thereof and "a" indicates the direction perpendicular to the longitudinal direction, as shown in FIG. 10. The maximum deflection is calculated according to Formula (2) under the similar conditions.

[Mathematical Formula 1]

$$\sigma = \beta_1 \frac{W \cdot a^2}{t^2} \qquad (1)$$

[Mathematical Formula 2]

$$\delta = \alpha_1 \frac{W \cdot a^4}{E \cdot t^3} \qquad (2)$$

As shown above, the maximum stress is 23 MPa and the maximum deflection is 6 mm when the maximum load conceivable in using the cassette type detector 1 is applied. In the meantime, the permissible stress for the glass plate (glass substrate) having a thickness of 8 mm or less, as in the glass substrates 213, 214 of the present embodiment, is 24.5 MPa. Further, the deflection not exceeding 6 mm is permissible. Thus, it can be said that such a problem as a crack will not occur to the glass substrates 213, 214 and detector unit 2 including the same, no matter what posture is used for radiographing.

Figure 13:
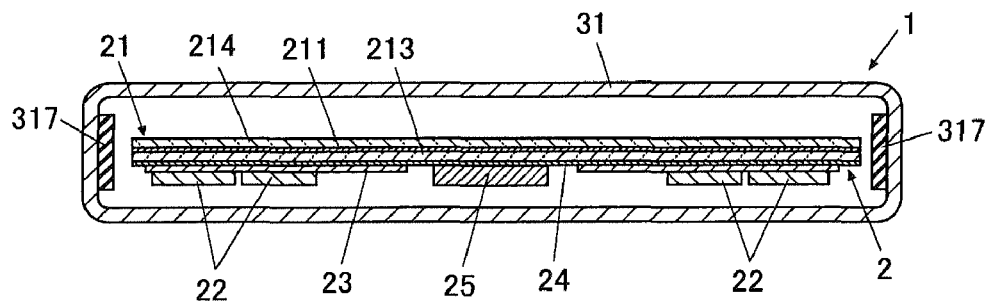
FIG. 13 is a cross sectional view taken along arrow line A-A of FIG. 12.

FIG. 12 is a plan view showing the detector unit 2 incorporated in the housing 3, as viewed from the top (the incoming side of the radiation at the time of radiographing). FIG. 13 is a cross sectional view taken along arrow line A-A of FIG. 12. FIG. 14 is a cross sectional view taken along arrow line B-B of FIG. 12. FIG. 12 schematically shows the arrangement of members inside the cassette type detector 1, wherein the upper side of the housing body 31, detection panel 21 and base 24 have been removed for purposes of description.

As shown in FIGS. 12 through 14, the detector unit 2 includes the circuit board 23 equipped with the detection panel 21 and various types of electronic components 22. In the present embodiment, the circuit board 23 is fixed on the base 24 formed of resin and others. Since this base 24 is bonded and fixed onto the detection panel 21, the circuit board 23 is fixed onto the detection panel 21 through the base 24. It should be noted that the base 24 is not an essential component of the present invention. The circuit board 23 can be directly fixed onto the detection panel 21 without using the base 24 as an intermediary.

As shown in FIG. 12, in the present embodiment, the circuit board 23 with the electronic component 22 mounted thereon is divided into four parts. Each of them is arranged close to the corner of the detection panel 21. The electronic components 22 are arranged along the outer periphery of the detection panel 21 on the circuit board 23. The electronic component 22 is preferably arranged at the position as closely as possible to the corners of the detection panel 21. If the electronic component 22 is arranged on the circuit board 23 in this configuration, the electronic component 22 can be arranged close to the corner of the housing 3 and on the edge of the housing body 31, along the region (highly rigid area) wherein deformation is less likely to be caused by the external force, when the detector unit 2 is incorporated into the housing 3. It should be noted that the numbers and layout of the circuit board 23 and electronic component 22 are not restricted to the ones illustrated here.

Figure 19:
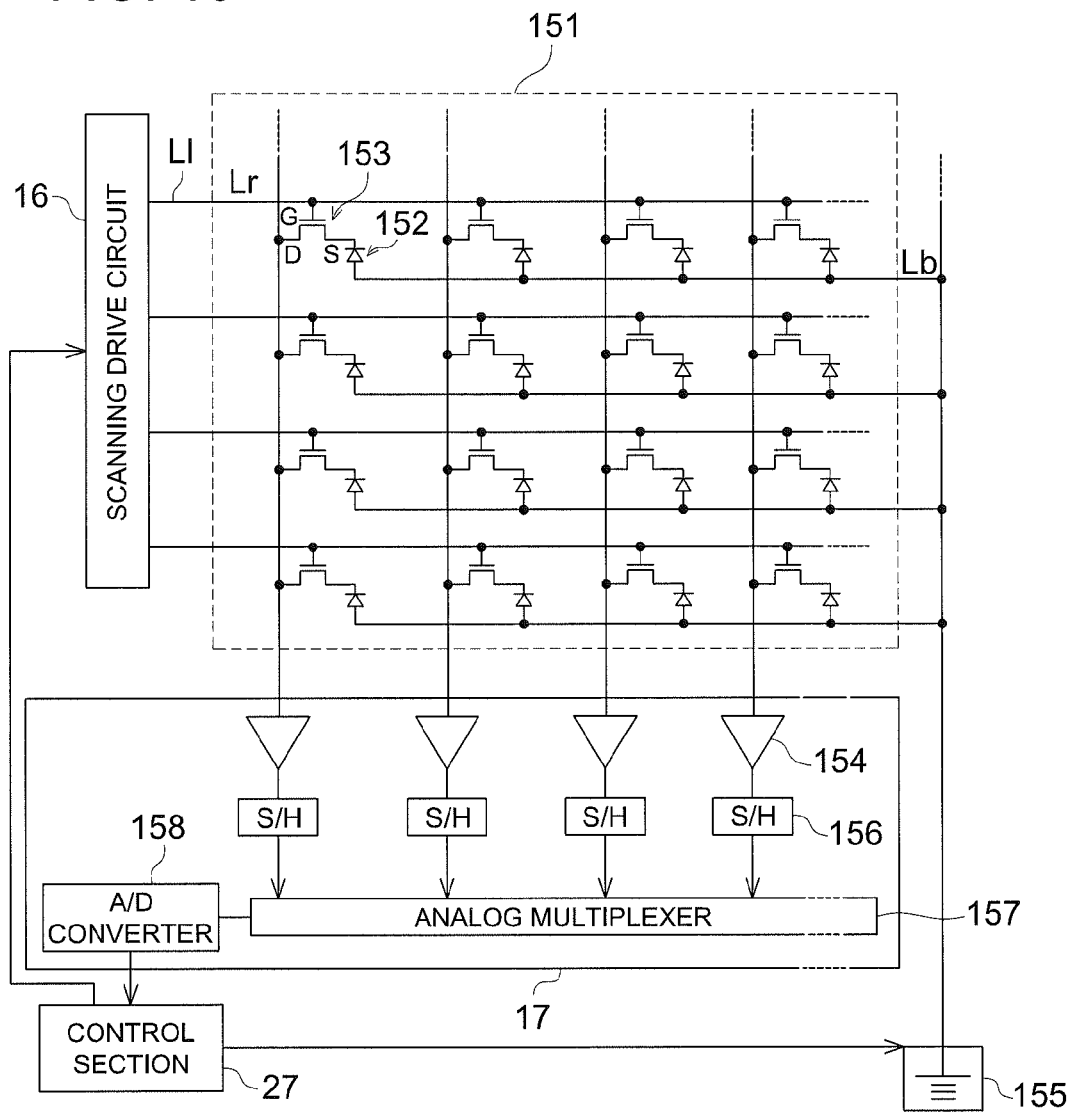
FIG. 19 is an equivalent circuit schematic diagram wherein the photoelectric conversion section of FIG. 18 is arranged in a two-dimensional array.

In the present embodiment, the electronic components 22 arranged on the circuit board 23 includes the CPU (Central Processing Unit) (not illustrated) constituting the printed circuit board 27 (FIG. 9) for controlling various sections, the memories (not illustrated) consisting of a ROM (Read Only Memory) and RAM (Random Access Memory), the scanning drive circuit 16 (FIG. 19), and the signal read-out circuit 17 (FIG. 19). Apart from the ROM and RAM, it is also possible to provide an image storage section for storing the image signal outputted from the detection panel 21, wherein the image storage section includes such a rewritable read-only memory as a flash memory.

The detector unit 2 is provided with a communication section (not illustrated) to exchange various forms of signals with an external device. The communication section ensures that the image signal outputted from the detection panel 21 is sent to the external device through the aforementioned antenna device 9, and the radiographing startup signal sent from the external device is received through the antenna device 9, for example.

A rechargeable battery 25 as the power supply section for supplying power to a plurality of drive sections constituting the cassette type detector 1 (e.g., scanning drive circuit 16 to be described later (FIG. 19), a signal read-out circuit 17 (FIG. 19), a communication section (not illustrated), a storage section (not illustrated), a recharge detection section (not illustrated), an indicator 47, the detection panel 21 and others) is installed on the base 24 close to the recharging terminal 45 provided with the first cover member 32 when the detector unit 2 is incorporated in the housing 3.

Such freely rechargeable battery as a NiCad battery, nickel hydrogen battery, lithium ion battery, small-sized sealed lead storage battery, lead accumulator and electric double-layer capacitor can be used as the rechargeable battery 25. Instead of the rechargeable battery 25, a fuel cell can be used. The configuration, size, quantity and layout of the rechargeable battery 25 as a power supply section are not restricted to the ones illustrated in FIG. 12 and others.

The rechargeable battery 25 is installed at a predetermined position on the base 24, whereby electrical connection with the aforementioned recharging terminal 45 is achieved. For example, the cassette type detector 1 is mounted on the recharging device (not illustrated) such as a cradle to be connected with an external device. Then the terminal of the recharging device and the recharging terminal 45 of the housing 3 are connected, whereby the rechargeable battery 25 is recharged.

At the end of the circuit board 23 connected with the electronic components 22 and rechargeable battery 25, a flexible harness 327 constructed with a flexible material is provided.

The aforementioned flexible harness 327 ensures the circuit board 23 and others to be electrically connected with the recharging terminal 45, power switch 46, indicator 47 and antenna device 9 as an interface component mounted on the first cover member 32. A connector or soldering method can be used to connect this flexible harness 327 with each interface component of the first cover member 32.

Figure 15:
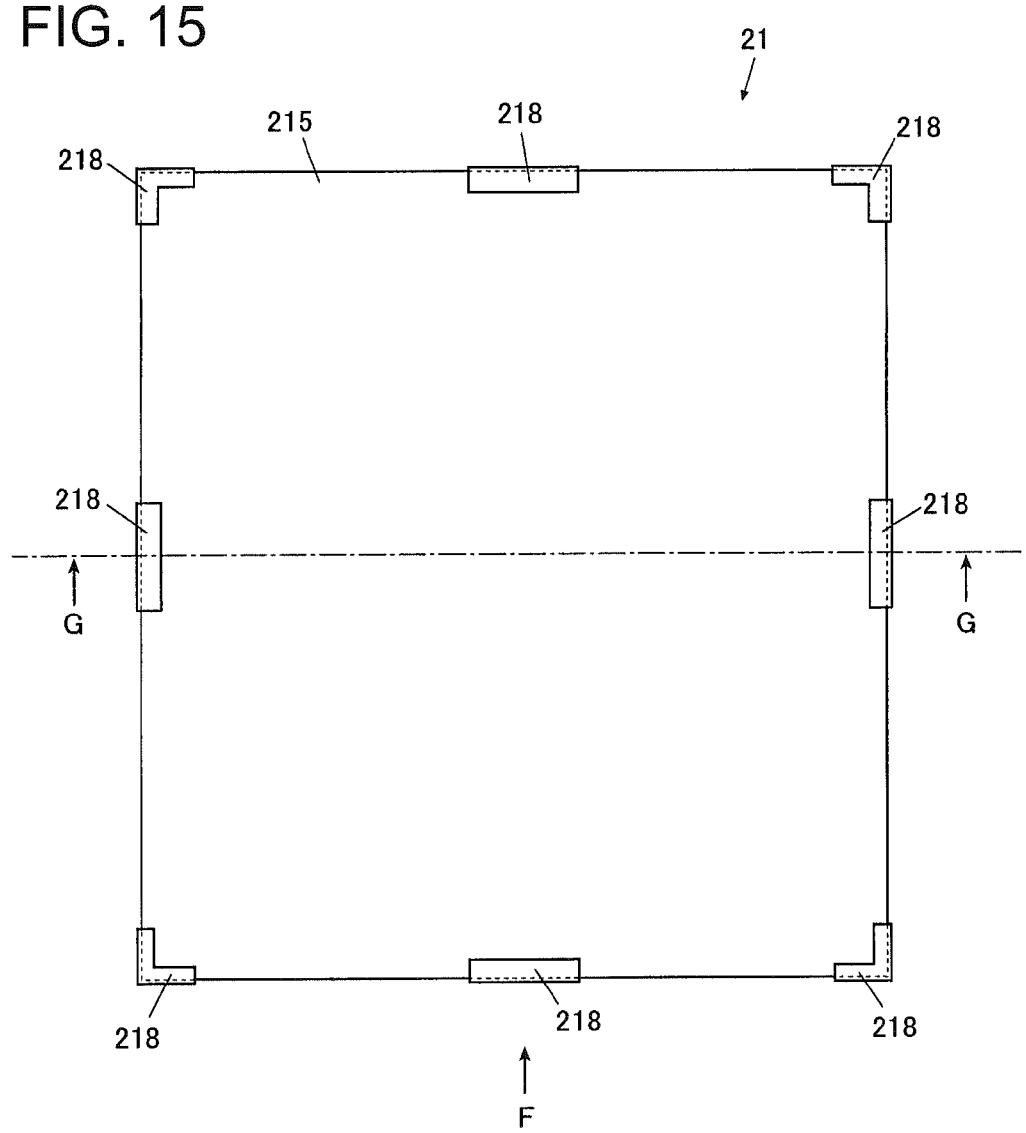
FIG. 15 is a plan view showing the detection panel in the present embodiment.
Figure 16:
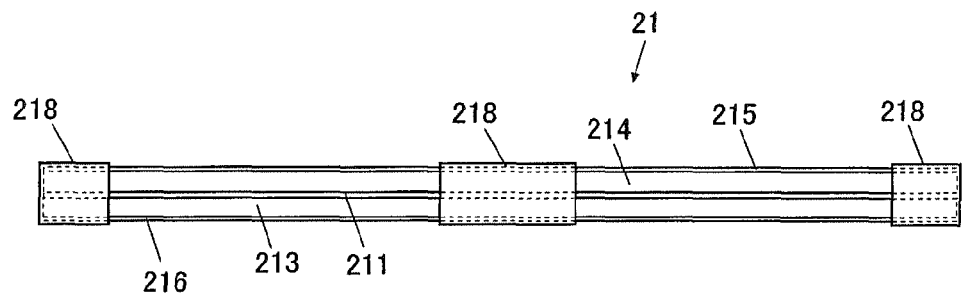
FIG. 16 is a side view of the detection panel of FIG. 15 as viewed from the direction of arrow F.
Figure 17:
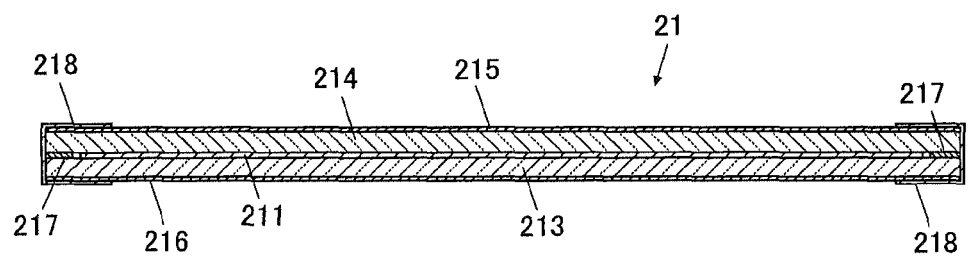
FIG. 17 is a cross sectional view of the detection panel taken along arrow line G-G of FIG. 15.

FIG. 15 is a plan view showing the detection panel 21. FIG. 16 is a side view of the detection panel 21 of FIG. 15 as viewed from the direction of arrow F. FIG. 17 is a cross sectional view of the detection panel 21 taken along arrow line G-G of FIG. 15.

The detection panel 21 is provided with a first glass substrate 214, one side of which is equipped with a scintillator layer (light emitting device layer) 211 as a scintillator for converting the incoming radiation into light, and a second glass substrate 213, one side of which is equipped with a signal detection section 151 (FIG. 19) laminated on the lower side of the scintillator layer 211 to detect the light obtained by conversion by the scintillator layer 211 and to convert the light into electric signal. The detection panel 21 is designed in a lamination structure made up of these components laminated one on top of another.

The scintillator layer 211 includes a major component of fluorophore and is designed to output the electromagnetic wave having a wavelength of 300 through 800 nm, namely, electromagnetic wave (light) including visible light as the center ranging from ultraviolet rays to infrared rays, in response to the incoming radiation.

The fluorophore that can be used in this scintillator layer 211 includes the fluorophore formed by using $CaWO_4$ and others as a base material and the fluorophore formed by activating a light emitting core material into the base materials such as CsI:Tl, $Gd_2O_2S$:Tb, ZnS:Ag and others. It is also possible to use the fluorophore expressed by the general formula $(Gd, M, Eu)_2O_3$ wherein M denotes rare earth element.

Particularly, CsI:Tl and $Gd_2O_2S$:Tb are preferably used because of a high degree of radiographic absorption and light emitting efficiency. Use of these elements provides a low-noise, high-quality image.

The scintillator layer 211 is produced, for example, by forming a fluorophore on the support member (not illustrated) in a laminated structure by the vapor phase growth method, wherein the support member is made of a polymeric material (polymer) such as a cellulose acetate film, polyester film or polyethylene terephthalate film. The fluorophore layer is made of the columnar crystal of fluorophore. The vapor phase growth method preferably used includes vapor deposition method, sputtering method, chemical vapor deposition (CVD) method. Any of these methods allows vapor phase growth of a fluorophore layer to be made, whereby an independent slender columnar crystal is formed on the support member.

A scintillator layer 211 is pasted on the lower side (opposite to the side where radiation enters at the time of radiographing) of the first glass substrate 214. A glass protective film 215 is further laminated on the upper side (where radiation enters at the time of radiographing) of the first glass substrate 214.

A second glass substrate 213 is laminated on the lower side (opposite to the side where radiation enters at the time of radiographing) of the scintillator layer 211. A glass protective film 216 is further laminated on the lower side of the second glass substrate 213.

Both the first glass substrate 214 and second glass substrate 213 have a thickness of about 0.6 mm. The end face is cut by laser, whereby a process of smoothing is performed to smooth the end face, namely, the cut end, the edge line portion of this cut end and upper side of the glass substrate, and the edge line portion of the cut end and the lower side of the glass substrate. It should be noted that the thickness of the first glass substrate 214 and second glass substrate 213 is not restricted to 0.6 mm. Further, the first glass substrate 214 and second glass substrate 213 can be designed to have different thicknesses.

The following describes the process of cutting the end faces of the first glass substrate 214 and second glass substrate 213 by laser, whereby smoothing is performed:

Glass is generally cut using the following two processes: The surface of the glass is striped (scratched) by a rigid and sharp object, and a vertical crack is formed across the thickness of the glass (by scribing process). Then stress is applied to expand this crack to cut the glass (by glass cutting process). In the conventional method, a cemented carbide alloy, electroplated diamond or sintered diamond was used in the process of scratching the glass (scribing process). However, when the surface of glass was scratched by a cemented carbide alloy or diamond, a microscopically roughened structure was formed on the end face of the cut (separated) glass. If the glass is exposed to the load of bending or others, stress was concentrated on the roughened structure. This caused the glass to be broken.

In the present embodiment, laser is used to scratch the surfaces of the first glass substrate 214 and second glass substrate 213. The laser used in this manner smoothes the end face of the glass after cutting (separation). This increases the strength of the glass against the load of bending and others.

The glass substrate is broken by the formation of burrs and partial roughened structures on the portion wherein stress is concentrated in the process of cutting off the glass substrate, rather than by the magnitude of the external force. The process of smoothing the end face after cutting protects the glass substrate against a considerable amount of external force (stress).

The YAG laser method is preferably used as the cutting device for cutting the end face of the first glass substrate 214 and second glass substrate 213 using laser. In the YAG laser method, YAG (Yttrium Aluminum Garnet) is used as a laser optical medium at the laser oscillation section. However, the cutting device that can be used in cutting the glass is not restricted thereto.

The signal detection section 151 as a detector is formed on the upper side (opposite to the scintillator layer 211) of the second glass substrate 213. This signal detection section 151 ensures that the electromagnetic wave (light) outputted from the scintillator layer 211 and is converted into the electric energy, and is accumulated, whereby the image signal based on the electric energy having been accumulated is outputted.

As described above, in the present embodiment, the signal detection section 151 is laminated on the lower side of the scintillator layer 211. The signal detection section 151 and scintillator layer 211 are arranged opposite to each other in the form sandwiched between the second glass substrate 213 arranged on the lower side of the signal detection section 151 and the first glass substrate 214 arranged on the upper side of the scintillator layer 211.

In the conventional art, it was considered that the glass substrate can be prevented from being broken, by controlling the stress acting on the internal glass substrate through the housing. Thus, a space was provided between the housing and glass substrate, and many buffer members for alleviating/reducing the external force were installed in this space. This conventional arrangement further increased the housing size.

The present inventors have found out that the glass substrate is broken by the formation of partial burrs or partial roughened structures on the portion wherein stress is concentrated in the process of cutting the glass substrate, rather than by the magnitude of the external force acting on the glass substrate. Thus, to remove the burrs or roughened structures on the portion wherein stress is concentrated, the end face is smoothed after cutting. This arrangement prevents the glass substrates 213, 214 from being broken by the load and deflection attributable to the weight of the patient, acting on the housing 3 of the aforementioned structure.

Sealing members 217 are provided along the outer peripheral edges of the first glass substrate 214 and second glass substrate 213. The first glass substrate 214 and second glass substrate 213 are bonded and connected with each other by these sealing members 217. This arrangement enhances the strength against the load of bending and others.

Further, when the first glass substrate 214 and second glass substrate 213 are bonded, air is removed from the space between the first glass substrate 214 and second glass substrate 213. After air has been removed, the first glass substrate 214 and second glass substrate 213 are bonded and connected by the sealing member 217. This arrangement ensures that the moisture contained in the air does not affect the scintillator layer 211 and others, and hence prolongs the service life of the scintillator layer 211 and others.

Further, buffer members 218 for protecting the detection panel 21 against the external impact are provided on the corners of the detection panel 21 and in the vicinity intermediate between corners.

Figure 18:
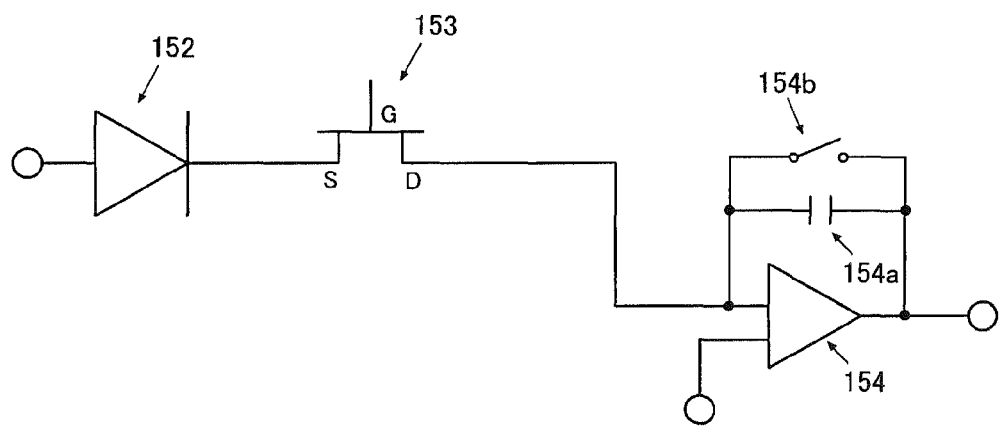
FIG. 18 is an equivalent circuit schematic diagram for one pixel in the photoelectric conversion section constituting a signal detection section.

The following describes the circuit configuration of the detection panel 21. FIG. 18 is an equivalent circuit schematic diagram for one pixel in the photoelectric conversion section constituting the signal detection section 151.

As shown in FIG. 18, the photoelectric conversion section for one pixel includes a photo diode 152 and a thin film transistor 153 (hereafter called "TFT") whereby the electric energy accumulated in the photo diode 152 is picked up as an electric signal by switching. The photo diode 152 is an image pickup element for generating and accumulating an electric charge. The electric signal picked up from the photo diode 152 is read by the amplifier 154, and is amplified to the level wherein it can be detected by the circuit 17.

To put it more specifically, upon receipt of the light having been applied, an electric charge is generated by the photo diode 152, and the signal readout voltage is applied to the gate G of the TFT 153. Then the electric charge is fed toward the drain D of the TFT 153 from the photo diode 152 connected to the source S of the TFT 153, and is accumulated in the capacitor 154a connected in parallel to the amplifier 154. The electric signal amplified in proportion to the electric charge accumulated in the capacitor 154a is outputted from the amplifier 154.

When the electric signal amplified is outputted from the amplifier 154 and is picked up, the switch 154b connected in parallel to the amplifier 154 and capacitor 154a is turned on and the electric charge accumulated in the capacitor 154a is released, whereby the amplifier 154 is reset. The photo diode 152 can be a photo diode equipped only with a regulation capacitance. Alternatively, an additional capacitor can be provided to improve the dynamic range of the photo diode 152 and photoelectric conversion section.

FIG. 19 is an equivalent circuit schematic diagram wherein such a photoelectric conversion section is arranged in a two-dimensional array. Pixel-to-pixel arrangement is made in such a way that the scan line Ll and signal line Lr are perpendicular to each other. The source S of the TFT 153 is connected with one end of the aforementioned photo diode 152, and the drain D of the TFT 153 is connected with the signal line Lr. In the meantime, the other end of the photo diode 152 is connected with the other end of the adjacent photo diode 152 arranged on each row, and is connected to the bias power source 155 through the common bias line Lb.

This bias power source 155 is connected to the control section 27. Voltage is applied to the photo diode 152 through the bias line Lb in response to the instruction from the control section 27. The gate G of the TFT 153 arranged on each row is connected to the common scan line Ll, and the scan line Ll is connected to the control section 27 through the scanning drive circuit 16. Similarly, the drain D of the TFT 153 arranged in each row is connected to the signal read-out circuit 17 which is connected to the common signal line Lr and is controlled by the control section 27.

The signal read-out circuit 17 is provided with an amplifier 154 for each of the aforementioned signal lines Lr. When the signal is read out, the signal readout voltage is applied to a selected scan line Ll. This allows the voltage to be applied to the gate G of each TFT 153 connected to the scan line Ll. The electric charge generated in the photo diode 152 flows to each signal line Lr from the photo diode 152 through each TFT 153. The electric charge is amplified by each amplifier 154 for each photo diode 152, and the information of the photo diode 152 for each row is picked up. This operation is performed for all scan lines Ll by switching the scan lines Ll, whereby information is picked up from all the photo diodes 152.

Each amplifier 154 is connected with a sample hold circuit 156. Each sample hold circuit 156 is connected to an analog multiplexer 157 provided in the signal read-out circuit 17. The signal read by the signal read-out circuit 17 is outputted to the aforementioned control section 27 from the analog multiplexer 157 through the analog-to-digital converter 158.

The TFT 153 can be an inorganic semiconductor used in the liquid crystal display and others, or an organic semiconductor.

The aforementioned description of the present embodiment has illustrated the case wherein the photo diode 152 as a photoelectric conversion element is used as a pickup element. However, a solid-state image pickup element other than the photo diode can be used as the photoelectric conversion element.

The side of the signal detection section 151 is provided with a scanning drive circuit 16 for feeding pulses to the photo diode 152 (photoelectric conversion element) and for scanning and driving the photo diode 152, and a signal read-out circuit 17 for reading the electric energy accumulated in each photoelectric conversion element.

The following describes the operation of the cassette type detector 1 in the present embodiment:

In the present embodiment, the second glass substrate 213 with the signal detection section 151 formed on one surface and the first glass substrate 214 with the scintillator layer 211 pasted on one surface are laminated in such a way that the scintillator layer 211 and signal detection section 151 are opposed to each other. After air between the first glass substrate 214 and second glass substrate 213 has been removed, the glass substrates 213, 214 are bonded and connected by the sealing member 217. Then the base 24 with the circuit board 23 with the electronic components 22 arranged thereon, and the rechargeable battery 25 arranged at specified positions is fixed onto the rear side of the second glass substrates 213 in such a way that the side mounted with the circuit board 23 and rechargeable battery 25 will face downward. This procedure completes production of the detector unit 2.

Upon completion of the production of the detector unit 2, the electronic component 22 and rechargeable battery 25 connected to the circuit board 23 of the detector unit 2, and the recharging terminal 45, power switch 46, indicator 47 and antenna device 9 provided on the first cover member 32 are electrically connected by means of a flexible harness 327.

A jig (not illustrated) is provided to guide the detector unit 2 by supporting from below, when the detector unit 2 is to be inserted into the housing body 31. This jig can be a rod-like or plate-formed jig.

When the first cover member 32 is to be inserted into the opening 311 of the housing body 31, the detector unit 2 connected with the first cover member 32 by means of the flexible harness 327 is put inside from the opening 311 and is slid along the jig while the detector unit 2 is pressed by the first cover member 32. Then the detector unit 2 is incorporated into the housing body 31.

The first cover member 32 is pushed inside until the engagement protruding section 325 of the engagement piece 324 are engaged with the engagement recessed section 315 of the housing body 31, whereby mounting of the first cover member 32 terminates.

Figure 20A:
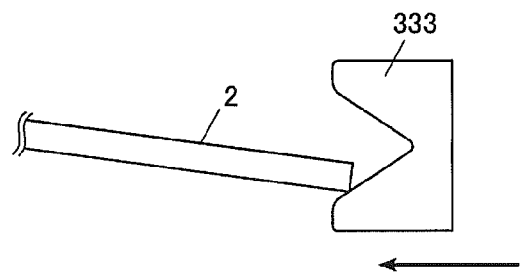
FIG. 20a is a diagram showing that the detector unit is hit against the inclination of a buffer member.
Figure 20B:
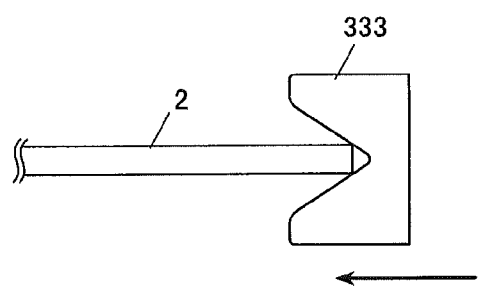
FIG. 20b shows a diagram showing that the detector unit is guided along the inclination of the buffer member and is moved to the horizontal position.

Upon termination of the incorporation of the detector unit 2 and mounting of the first cover member 32, the jig is removed from the opening 312 of the housing body 31. After that, the second cover member 33 is fitted into the opening 312. In this case, as shown in FIG. 20a, if the end of the detector unit 2 is inserted while it is tilted downward by the dead weight, the end of the detector unit 2 will be pushed against the inclination of the end of the buffer member 333. In this case, the end of the detector unit 2 is guided horizontally along the inclination on the end of the buffer member 333, as shown in FIG. 20b, by pushing in the second cover member 33 additionally. The second cover member 33 is pushed inside until the engagement protruding section 335 of the engagement piece 334 is engaged with the engagement recessed section 316 of the housing body 31, whereby the housing 3 is integrated into one unit with the interior hermetically sealed.

Figure 20C:
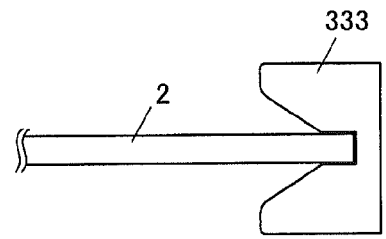
FIG. 20c is a diagram showing that the detector unit is held by the buffer member.

At the same time, the shape of the buffer member 333 is deformed in conformity to the shape of the end of the detector unit 2, as shown in FIG. 20c. The end of the detector unit 2 is held in position by the buffer member 333.

This arrangement ensures that one end of the detector unit 2 is supported by the buffer member 323 arranged on the side of the first cover member 32, while the other end is supported by the buffer member 333 arranged on the side of the second cover member 33. As described above, the detector unit 2 has only two ends supported, and spaces are provided in the vertical direction. Thus, the impact given in the vertical direction is absorbed by these spaces so that the external force is not directly transmitted to the detector unit 2.

When the cassette type detector 1 is used for radiographing, for example, the patient to be radiographed is made to lie on the bed. The cassette type detector 1 is placed between the bed and the patient body, wherein the side of the cassette type detector 1 provided with the scintillator layer 211 faces upward. Under this condition, the patient is radiographed. It should be noted that, when using the cassette type detector 1, the cassette type detector 1 can be mounted on the Bucky's table used for radiographing by the existing CR cassette.

As described above, in the present embodiment, the housing body 31 of the cassette type detector 1 is designed in a seamless, integrally molded rectangular tubular structure. Thus, the cassette type detector 1 has a sufficient omni-directional strength to withstand radiographing of the patient, despite the reduced film thickness (16 mm or less). At the same time, the dimension is kept within the range specified in the JIS for the conventional screen/film cassette. Accordingly, when radiographing is performed using the cassette type detector 1 as the cassette FPD, it is possible to utilize the existing device and equipment such as the Bucky's table provided for use with the CR cassette.

A seamless structure is ensured by use of the components constituting the housing 3 of the cassette type detector 1. This arrangement ensures that the water content or foreign substances such as powder dust, sweat of the patient and antiseptic solution cannot easily enter the housing. Thus, the prolonged service life of the internal electrical component is ensured by this arrangement as well as the minimized damage given to the electronic components resulting from the reduction of deformation of the housing 3.

Further, the weight of the patient is applied to the cassette type detector 1 at the time of radiographing. This requires increased rigidity (strength) against the load. However, in the present embodiment, the detection panel 21 is structured in such a way that the scintillator layer 211 and signal detection section 151 are sandwiched between two glass substrates (first glass substrate 214 and second glass substrate 213). At the same time, these glass substrates 213, 214 are cut by laser, whereby the ends are provided with a process of smoothing. This provides upgraded bending rigidity (bending strength) of the glass substrates 213, 214.

In the present embodiment, the detector unit 2 and first cover member 32 are electrically connected and the first cover member 32 is fit into the opening 311, whereby insertion of the detector unit 2 into the housing body 31 terminates. Then the second cover member 33 is fit into the opening 312, whereby assembling of the housing 3 terminates. This arrangement ensures efficient work to be performed in the production process in the factory. At the same time, there is no very severe requirement for precision in the assembling of the detector unit 2. This is expected to ensure an enhanced yield rate.

Further, the scintillator layer 211 and signal detection section 151 are sandwiched between two glass substrates (first glass substrate 214 and second glass substrate 213). This structure prevents the scintillator layer 211 and signal detection section 151 from being damaged when exposed to external force.

Air is removed from the space between the first glass substrate 214 and second glass substrate 213. This arrangement prevents the scintillator layer 211 from being corroded by the moisture that might be contained in air.

In the present embodiment, the antenna device 9 is arranged 6 mm or more apart from the member (housing body 31) formed of a conductive material. This arrangement provides a high degree of receiving sensitivity and gain of the antenna device 9.

Figure 21:
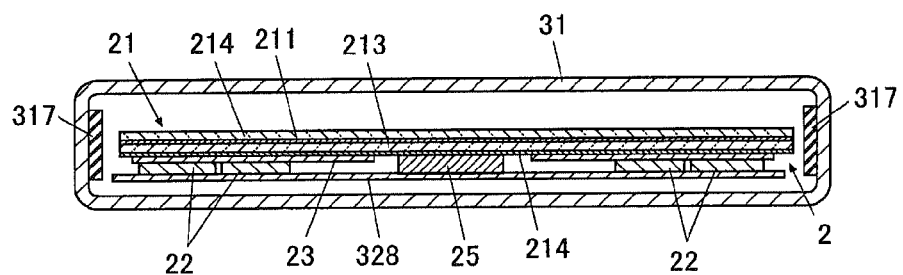
FIG. 21 is a cross sectional view showing a variation of the cassette type detector of FIG. 1.
Figure 22:
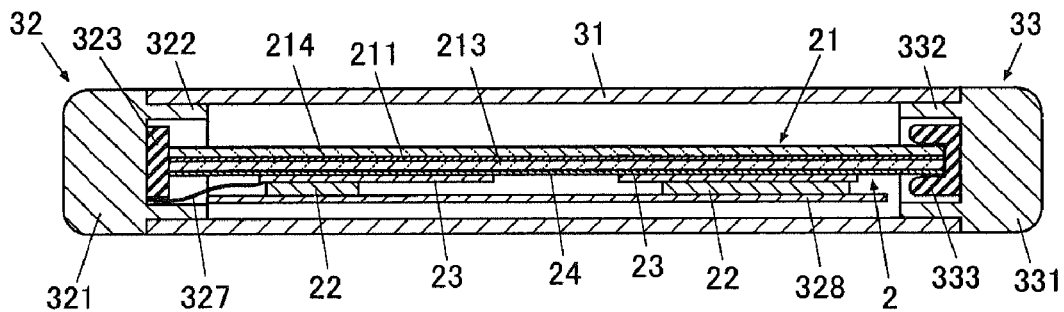
FIG. 22 is a cross sectional view showing another variation of the cassette type detector of FIG. 1.

In the present embodiment, when the detector unit 2 is inserted into the housing body 31, a jig is used to guide the detector unit 2. It is also possible to use the arrangement wherein the first cover member 32 is provided with a support member 328 for supporting the detector unit 2, as shown in FIGS. 21 and 22, and the detector unit 2 is inserted into the housing body 31, with the detector unit 2 kept mounted on the support member 328.

Figure 23:
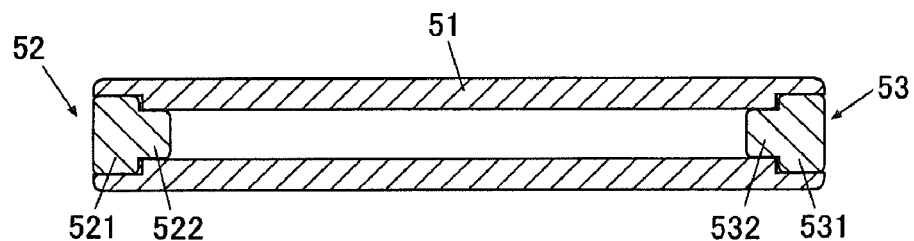
FIG. 23 is a cross sectional view showing a variation of the engagement portion between the cover member of the cassette type detector of FIG. 1 and housing body.

The shapes of the first cover member 32 and second cover member 33 are not restricted to the ones illustrated here. For example, as shown in FIG. 23, both the cover bodies 521, 531 of the cover members 52, 53 and the insertion sections 522 and 532 can be fitted inside the housing body 51.

Figure 24:
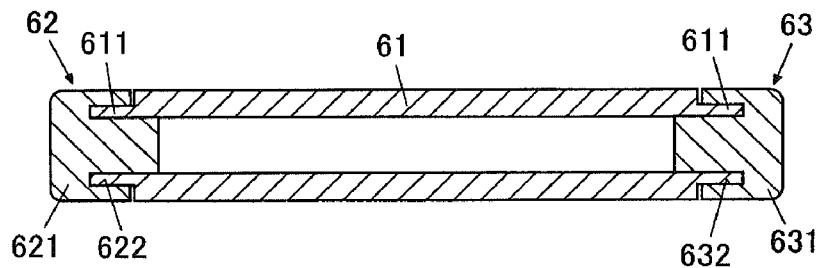
FIG. 24 is a cross sectional view showing a variation of the cassette type detector of FIG. 1.

It is also possible to arrange such a configuration, as shown in FIG. 24, that the cover bodies 621, 631 of the cover members 62, 63 are provided with grooves 622 and 632, and each opening end of the housing body 61 is equipped with an insertion section 611 as an engagement device. This insertion section 611 is inserted into the grooves 622, 632, whereby the cover members 62, 63 and housing body 61 are engaged with each other.

Figure 25A:
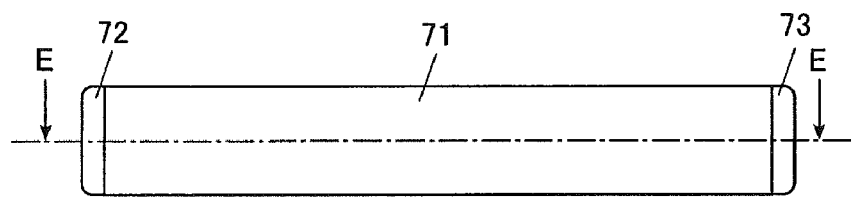
FIG. 25a is a side view showing an variation of the cassette type detector of FIG. 1.
Figure 25B:
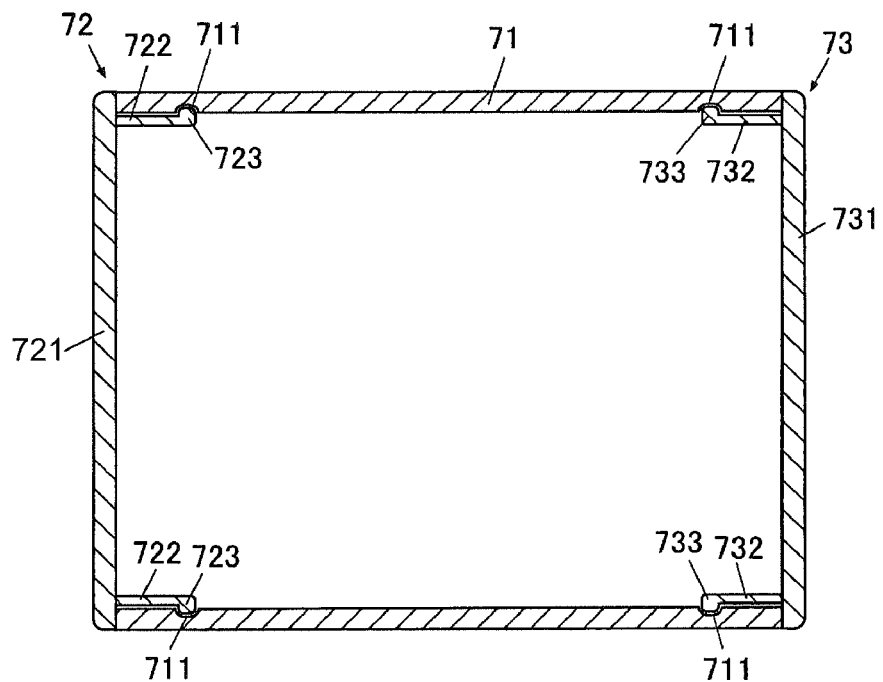

Further, it is also possible to arrange such a configuration, as shown in FIGS. 25a and 25b, the cover bodies 721, 731 are provided directly with the engagement pieces 722, 732 as engagement devices, without the cover members 72, 73 being provided with an insertion section, and the engagement protruding sections 723, 733 arranged on the engagement pieces 722, 732 are engaged with the engagement recessed section 711 formed inside the housing body 71, whereby e cover members 72, 73 and housing body 71 are engaged with each other.

In the present embodiment, the first cover member 32 and second cover member 33 are fixed to the housing body 31. Once assembling has been completed, disassembling cannot be made without destroying the cover members 32 and 33. However, the first cover member 32 and second cover member 33 can be removably mounted on the housing body 31. In this case, for example, the engagement recessed section of the housing body is used as a through-hole that penetrates the housing body from inside to outside, and this through-hole is sealed from outside. When the first cover member and second cover member are to be removed after assembling, sealing is removed and a rod-shaped object is inserted into the though-hole. The engagement protruding section is pushed out and engagement is undone. After that, the first cover member and second cover member are removed from the housing body.

The foregoing description of the present embodiment refers to the example of an indirect conversion type FPD wherein the detection panel 21 is made up of a scintillator layer 211 and signal detection section 151. The FPD is not restricted to the indirect conversion type. For example, an amorphous (a-Se) layer for absorbing the radiation and converting the radiation into electric charge is provided, and radiation photon is drawn into this a-Se layer at a high voltage. Then the structure of the present embodiment having the a-Se layer sandwiched between two glass substrates can be employed in the direct conversion FPD wherein the radiation energy of the radiation applied to the detector is directly converted into electric charge (conversion into electric signal).

In the present embodiment, the scintillator layer 211 is a fluorophore formed on the support member by the vapor phase growth method. The aforementioned description of the present embodiment uses an example wherein this is pasted to one side of the first glass substrate 214, whereby the scintillator layer 211 is formed on the first glass substrate 214. Without the scintillator layer 211 being restricted thereto, it is also possible to form a scintillator layer on the first glass substrate, using the technique wherein the fluorophore is directly vapor-deposited on the surface of the lower side (opposite to the side where radiation enters) of the first glass substrate.

In the present embodiment, the signal detection section 151 is formed on the second glass substrate 213. It is also possible to arrange such a configuration that the signal detection section 151 is formed as a separate structure from the second glass substrate and is then mounted on the second glass substrate.

Further, the foregoing description of the present embodiment employed the example of using laser to scratch the glass surface to smooth the end face. However, the smoothing technique is not restricted to this technique. For example, the cemented carbide alloy or diamond is used to cut off the first glass substrate and second glass substrate. After that, the cut end face is ground or heat treatment is performed by laser. The end face can be smoothed by using such ex-post treatment method.

The foregoing description of the present embodiment employed the two-stage work process, wherein laser was used to scratch the glass surface, and the glass substrate was then cut off (separated). Without being restricted to this method, it is also possible to use the procedure of using laser to scratch and cut off the glass substrate.

In the example of the present embodiment, a rechargeable secondary battery (rechargeable battery 25) was used as the power supply section. However, the power supply section is not restricted to the secondary battery. For example, it is possible to use a primary battery that needs replacement, such as a manganese battery, nickel cadmium battery, mercury battery or lead battery.

It goes without saying that, without being restricted to the aforementioned embodiment, the present invention can be modified as appropriate.

The invention claimed is:

1. A cassette type radiographic image solid-state detector comprising:
a detector unit which converts incoming radiation into an electrical signal, wherein the detector comprises a glass substrate; and
a housing which includes a rectangular tubular housing body provided with openings for insertion of the detector unit at both ends of the housing body, and a fist cover member and a second cover member to cover the respective openings of the housing body;
wherein the rectangular tubular housing body is made of resin molded body having a predetermined thickness including carbon fiber, and the housing body is integrally molded in a seamless shape and a cross section of the housing keeps constant along the tubular;
wherein, each of the fist cover member and the second cover member comprises an insertion section for reinforcing the openings of the housing body by inserting and fitting the insertion section to the openings; and
wherein an amount of deformation of the assembled housing is restricted within a predetermined range in all direction at a time of radiographing against weight of a patient and the maximum stress applied to the detector unit inside the housing will not exceed maximum permissible stress of the glass substrate.

2. The cassette type radiographic image solid-state detector of claim 1, wherein the carbon fiber included in the resin molded body is wound and the resin molded body is formed into and endless shape.

3. The cassette type radiographic image solid-state detector of claim 1, wherein the first cover member and the second cover member comprises a buffer member that is capable of alleviating an external force transferred from outside.

4. The cassette type radiographic image solid-state detector of claim 1, wherein the carbon fiber is wound around a core material of the rectangular tubular housing body to get a desired thickness of from 1 to 2 mm.

5. The cassette type radiographic image solid-state detector of claim 1, wherein pitch based carbon fiber is used as the carbon fiber constituting the rectangular tubular housing body.

6. A cassette type radiographic image solid-state detector comprising:
a detector unit which converts incoming radiation into an electrical signal, wherein the detector comprises a glass substrate; and
a housing which includes a rectangular tubular housing body provided with openings for insertion of the detector unit at both ends of the housing body, and a first cover member and a second cover member to cover the respective openings of the housing body;
wherein the rectangular tubular housing body is made of resin molded body having a carbon fiber which is wound around a core material of the rectangular tubular housing body to get a thickness of the tubular housing body of 1 mm to 2 mm, and the housing body is integrally molded in a seamless shape and a cross section of the housing body keeps constant along the tubular;
wherein, each of the first cover member and the second cover member comprises an insertion section for reinforcing the openings of the housing body by inserting and fitting the insertion section to the openings; and
wherein an amount of deformation of the assembled housing is restricted within a predetermined range in all directions at a time of radiographing against weight of a patient and the maximum stress applied to the detector unit inside the housing will not exceed maximum permissible stress of the glass substrate.

7. The cassette type radiographic image solid-state detector of claim 6, wherein the first cover member and the second cover member comprises a buffer member that is capable of alleviating an external force transferred from outside.

8. The cassette type radiographic image solid-state detector of claim 6, wherein each of the insertion section of the first cover member and the second cover member just fits respective inner surface of the openings.

* * * * *